W. MONTGOMERY.
Car Brake.

No. 9,098.

2 Sheets—Sheet 1.

Patented July 6, 1852.

W. MONTGOMERY.
Car Brake.

No. 9,098.

2 Sheets—Sheet 2.

Patented July 6, 1852.

UNITED STATES PATENT OFFICE.

WILLIAM MONTGOMERY, OF ROXBURY, MASSACHUSETTS.

RAILROAD-CAR BRAKE.

Specification of Letters Patent No. 9,098, dated July 6, 1852.

*To all whom it may concern:*

Be it known that I, WILLIAM MONTGOMERY, of Roxbury, in the county of Norfolk and State of Massachusetts, have invented a new and useful Mechanism for Arresting or Diminishing the Velocity of a Car While in Motion on a Railway; and I do hereby declare that the same is fully described and represented in the following specification and the accompanying drawings, letters, figures, and references thereof.

Figure 1:
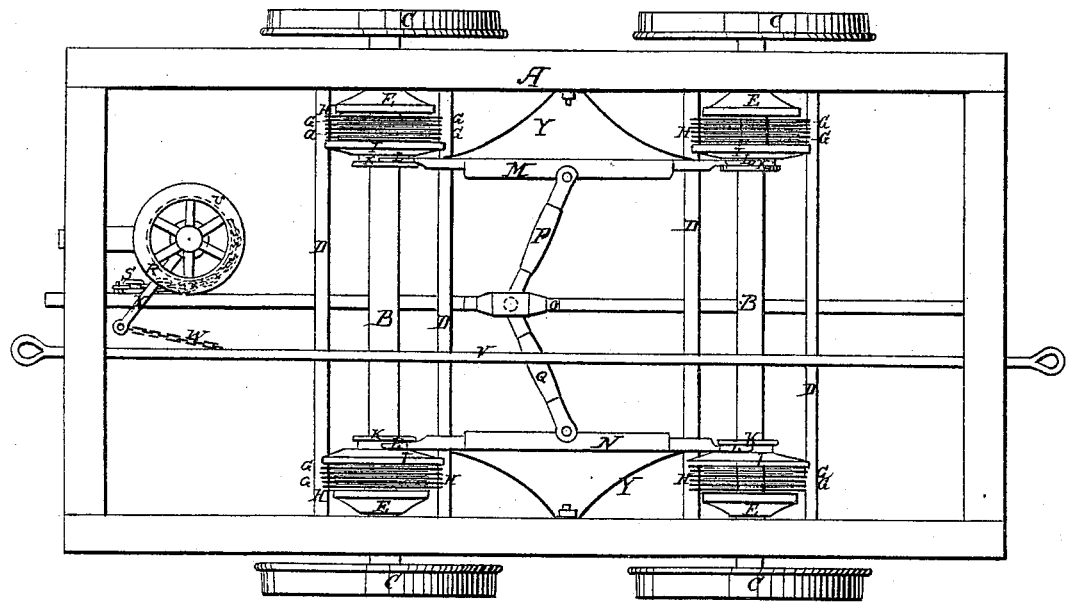
Figure 2:
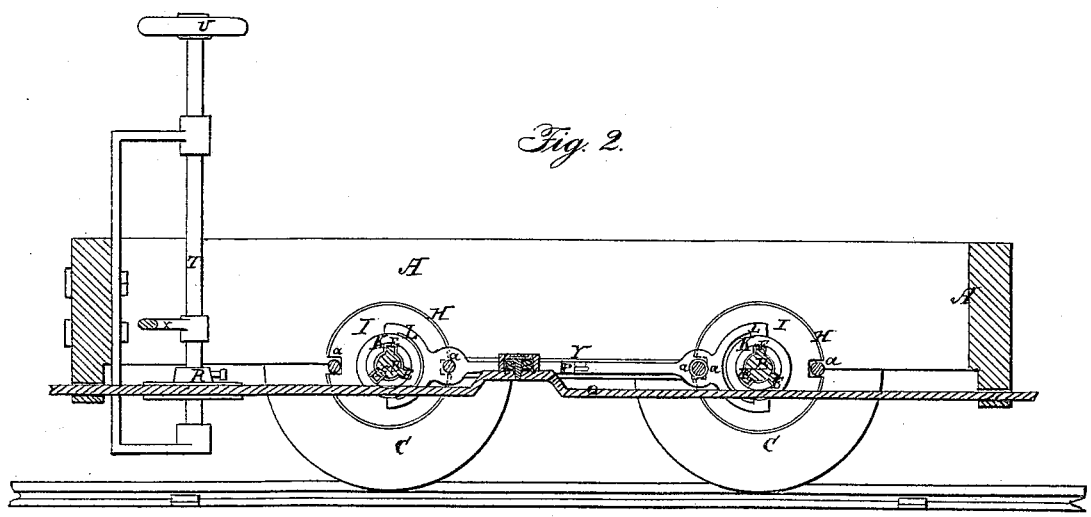
Figure 3:
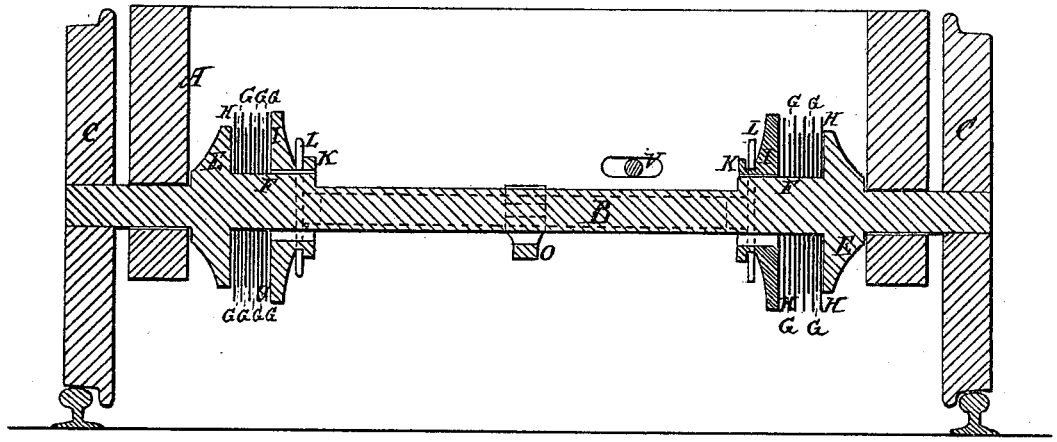

Of the said drawings Figure 1 denotes a top view of a car truck frame having my improvement applied to it. Fig. 2 is a central, vertical, and longitudinal section, and Fig. 3 is a transverse and vertical section of it, the latter being taken through one of the axles of the wheels.

In the said drawings A represents the truck or carriage frame, B, B, the two axles thereof, C, C, C, C, the four wheels.

On each side of each axle a rod D is placed, and made parallel to the axle and is supported by having its ends firmly fastened on the truck frame.

There are two circular disks or heads E, E, fixed in and to each axle just within the sides of the truck frame. There is also one or more splines or feathers F fixed on the external surface of the axle and extended from each plate E. One or more circular plates or disks G, G, G, &c., is placed on the axle and parallel to each head E, as seen in the drawings. Each of these disks should be so applied to the axle as to be capable of being freely slid or moved endwise, while by the feather or feathers it is caused to revolve with the axle.

Figure 6:
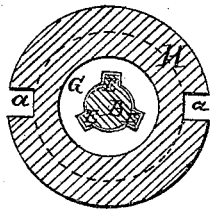
Figure 4:
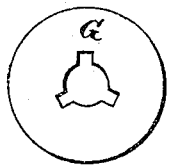
Figure 5:
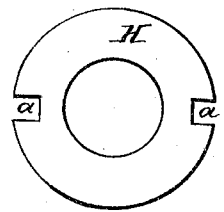

There are one or more other circular plates H, H, &c., of larger diameter placed on the axle and near and parallel to each disk E. Each plate H has a circular hole through its middle made with a radius larger than the distance from the center of the axle to the external surface of the spline or feather, or in other words so that the axle and its spline or feather may turn around freely within the said hole without causing any rotary movement of the plate H. In Figs. 4 and 5 side views of each one of these plates G, H, are represented, while in Fig. 6 I have given a cross section of the axle showing the application of the plates to it.

To each plate or head E there is a pressure plate I placed on the axle, and having an orifice or passage through its middle of the same diameter as that of each of the plates H. This plate slides endwise on the splines or feathers, and has a hub K whose periphery is grooved out entirely or partially around the wheel, the same being for the reception of a fork L.

The several plates H, H, &c., and I are supported in position and prevented from revolving by means of the two cross bars or rods D, D, arranged on each side of each set of such plates, the said cross bars being made to pass through notches or their equivalents made in or near the circumference of each plate as seen at a, a, in Figs. 2 and 5.

The two forks L, L, situated on the same side of the truck are connected to a slide bar M that is supported on and slides freely on the cross bars D, D, as seen in the drawings. The same may be said of the other two forks on the opposite side of the truck frame, they being connected to a slide bar N that slides freely on two of the said bars D, D.

Midway between and parallel to each of the bars M, N, there is a long slide rod or bar O, which is connected to the two bars M, N, by toggles P, Q, and so that when the rod or bar O is moved longitudinally in one direction, it will cause the toggles to approach a straight line with one another, and thereby move the two bars M, N, away from one another, so as to press the four pressure heads or plates I, I, I, I, toward their respective heads D, D.

In order to move the rod O a windlass pulley R is used, such rod being connected to the curved surface or periphery of the pulley by a chain S. This pulley is fixed on the lower part of an upright shaft T that has a hand wheel U fixed on its upper end.

The windlass usually employed on the other end of a car may be connected by a chain to a slide rod V, which slide rod is connected by a chain W to an arm X projected from the shaft T as seen in the drawings, so that when the said windlass is turned up the slide rod V may be put in motion so as to actuate the machinery that gives motion to the toggles, in such manner as to cause the slides M, N, to be moved asunder.

One or more springs Y may be applied to the car frame so as to bear against the slides M, and N, and produce a movement of them in opposite directions, or toward one another when the power for operating the windlass is removed from it.

From the above it will be seen that the disks E, G, G, &c., are revolved with and by their respective axles; also that the disks H, H, &c., and the pressure plate I, do not revolve, but simply slide on the bars D, D, that support them. The arrangement of the respective disks or plates of a set with respect to one another and so that they may be side by side, is shown in the drawings. It will also be observed that each or nearly every one of the plates H has a movable plate or disk on each side of it, so that when these three plates are pressed together and two are in revolution while the middle one is not so, there will be four surfaces or sides of the plates in contact, the two in motion respectively rubbing against the two that are still. When but two plates are used one being stationary and the other in revolution, there can only be one surface made to rub against another one, but if three plates are employed, the friction surface is increased so that there are four surfaces in action. If four plates are used there will be six surfaces in action. If five plates, eight surfaces. If six plates, ten surfaces. If seven plates, twelve surfaces. If eight plates fourteen surfaces, the number of surfaces increasing in a greater proportion than the number of plates.

From the above it will be seen that a small increase of the number of plates will make a very powerful brake; that one composed of four plates is three times as effective as one of two plates, the mere duplication giving a great increase of friction surfaces; also that my invention is not a mere duplication of plates without any gain or improvements beyond an effect double in amount, but it produces an increase of effect beyond the double amount. In the application of my improved brake to railway cars as described the rods D, D, and plates upheld by them serve to sustain the axle, should it become broken in the middle or near the same.

I do not claim the mere combination of two plates or surfaces, one of which shall be made to rub against the other and constitute a friction brake, but What I do claim as my invention is—

1. My improved brake composed of three or any greater number of plates or disks arranged side by side and on a shaft, and having some one or more of them connected with the shaft so as to be revolved by it, and the others held stationary so as not to be revolved, and the whole except one of the outer ones made to slide endwise on the shaft, and combined with an apparatus or means of pressing them toward and against one another substantially as specified.

2. I also claim the combination of the cross rods D, D, with their friction plates and axle, for the purpose of sustaining the axle in case of friction of it as specified.

In testimony whereof I have hereto set my signature this twenty-first day of May, A. D. 1852.

W. MONTGOMERY.

Witnesses:
R. H. EDDY,
GEORGE N. CUTLER.